United States Patent [19]

Chambers

[11] 4,277,838
[45] Jul. 7, 1981

[54] DATA RECEIVING APPARATUS

[75] Inventor: John P. Chambers, Crawley, England

[73] Assignee: British Broadcasting Corporation, London, England

[21] Appl. No.: 36,259

[22] Filed: May 4, 1979

[30] Foreign Application Priority Data

May 8, 1978 [GB] United Kingdom ............... 18293/78

[51] Int. Cl.³ ............................................. G11C 13/00
[52] U.S. Cl. ..................................... 365/222; 307/238.1
[58] Field of Search ................... 365/222, 49; 307/238

[56] References Cited

U.S. PATENT DOCUMENTS 3,713,114  1/1973  Linton et al. .......................... 365/222
3,737,879  6/1973  Greene et al. ......................... 365/222

Primary Examiner—Terrell W. Fears
Attorney, Agent, or Firm—Robert F. O'Connell

[57] ABSTRACT

Data receiving apparatus for receiving repetitively transmitted blocks of data stores a block of data (register 10), and compares (comparator 12) each received byte in DI with the corresponding stored byte in D(n). If the bytes match (M) a data selector 15 selects either byte for storage and sets a flag bit for that byte in a register 14 to 1. If the bytes do not match, the data selector selects the new byte when the existing flag bit is 0 and selects the old, stored byte when the existing flag bit is 1, in either event setting the flag bit to 0. In this way the probability is that each stored byte is an error free byte. A status circuit 16 signals when all flag bits are not 1 to indicate that suspicion nevertheless attaches to the block as stored.

4 Claims, 1 Drawing Figure

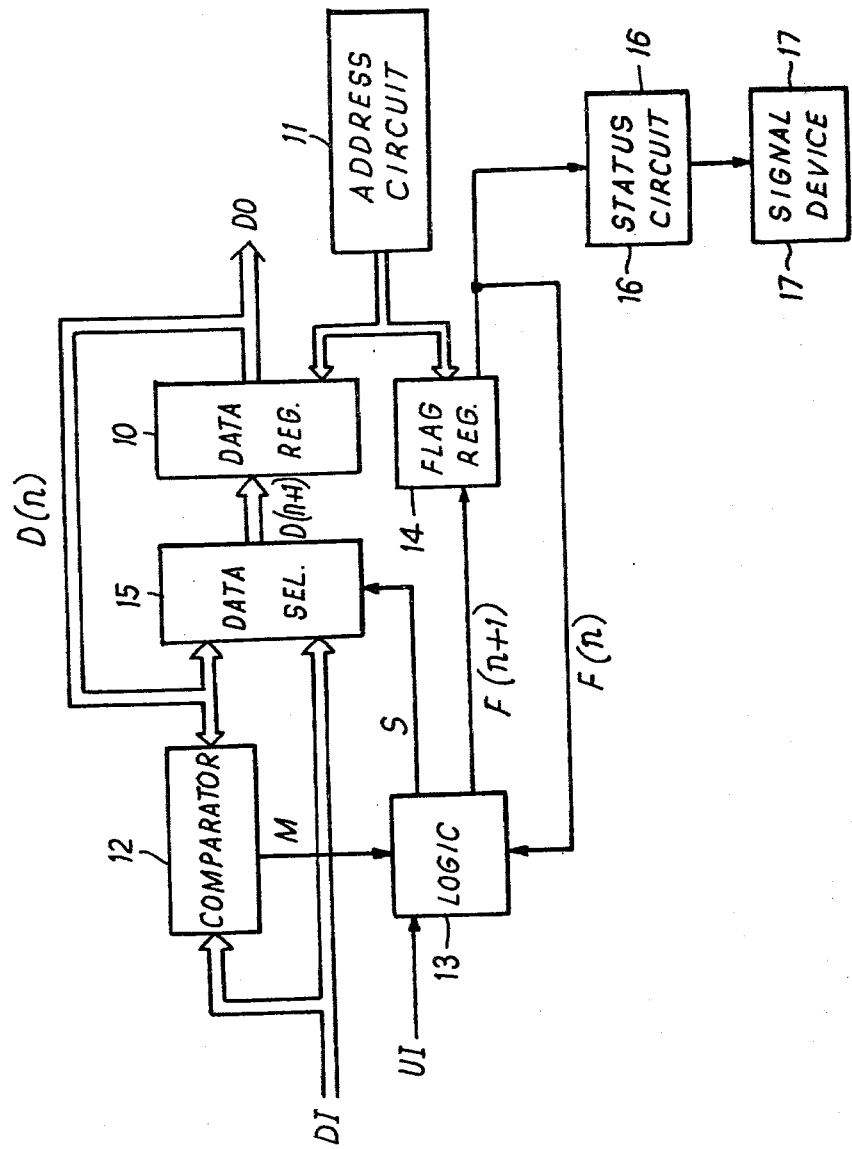

DATA RECEIVING APPARATUS

The present invention relates to data receiving apparatus of the type which receives and stores a block of data consisting of a plurality of bytes, and which is used to receive repetitively transmitted blocks of data. From the point of view of the receiving apparatus, each transmission constitutes a refresh cycle. An example of such apparatus is a teletext receiver. Although the invention is not restricted to such use, it will be described largely in terms of the U.K. "Broadcast Teletext Specification" as set forth in a document so entitled, published September 1976 by British Broadcasting Corporation and others. In this context a block of data is a page of data to be displayed on the screen of a television receiver incorporating or coupled to the data receiving apparatus. Furthermore the bytes correspond to characters and consist each of 7 data bits plus an odd parity bit.

One of the strengths of the UK Broadcast Teletext System is the operation of the receivers in such a way that any isolated errors in a received and displayed page are usually corrected automatically when the page is next transmitted, as new information takes precedence over old. Only character bytes satisfying the odd-parity check are written into storage and, until the first such byte has been received for each position in a new page, a substitute character, normally a space is displayed to give an idication of error. Although this correction by repeated transmission could be used to advantage simply by recording the page as received many times and using a character-by-character 'majority' decision, the use of odd-parity detection as described above does give a more immediate indication of a correctly received page. Nevertheless, there are circumstances where this protection is clearly insufficient, and methods offering improved security have already been described in British patent application 12698/77, corresponding to German Offenlegungsschrift No. 2 812 435 published 28.9.78.

In order to offer the possibility of an extended alphabet of up to, perhaps, 200 characters for use in a common European teletext system it has been proposed in British patent application No. 41265/77, (the corresponding German Offenlegungsschrift No. 2 821 886 is due to be published in May 1979), that almost the entire range of 8-bit codes be used for characters, the odd-parity codes being used in the same way as is set forth in the document "Broadcast Teletext Specification" in order to maintain compatibility. (CEEFAX is our Trade Mark for our broadcast teletext system). Thus a basic character set (including control characters) is provided by the odd-parity codes. At least some additional characters are transmitted as even-parity codes. This proposal precludes the use of a simple parity check to detect errors although more complex methods of error detection such as are described in the aforesaid application No. 12698/77 could still be used.

The object of the present invention is to provide data receiving apparatus which makes use of the repeated transmissions of blocks of data to effect error correction without the use of parity checks and without the need for long-term recording or observations, as would be necessary if a majority decision technique were to be employed.

According to the invention there is provided data receiving apparatus comprising means for storing a block of received bytes, means for storing at least one flag bit individual to each byte, and control means operable in each refresh cycle of the apparatus and on a byte-by-byte basis to compare the currently received byte with the currently stored corresponding byte, to subject the corresponding flag bit(s) to a non-cyclic count operation of one sense when the compared bytes match and of the other sense when the compared bytes do not match, and to replace the stored byte by the received byte, when they do not match, conditionally in dependence upon the state of the corresponding flag bit(s) established in the preceding refresh cycle.

By a non-cyclic count operation, is meant an operation bounded by limit states in both senses; once a limit state is reached, further count operations in the corresponding sense do not cause any further change of state.

Of particular interest is the simplest possible case in which there is a single flat bit per byte capable of assuming only the states 0 and 1 which can be arbitrarily assigned to match and mismatch conditions. In the example explained below it is assumed that match $=1$ and mismatch $=0$. Operation can then be as set out in Table 1.

TABLE 1

| INPUTS | | | OUTPUTS | |
|---|---|---|---|---|
| UP-DATE? | MATCH | OLD FLAG | BYTE STORED | NEW FLAG |
| NO | YES | 0 | EITHER | 1 |
| NO | YES | 1 | EITHER | 1 |
| NO | NO | 0 | NEW | 0 |
| NO | NO | 1 | OLD | 0 |
| YES | DON'T CARE | DON'T CARE | NEW | 0 |

The meaning of UPDATE will be explained below. Consider firstly rows 1 to 4 of Table 1. If the old (currently stored) byte matches the new (currently received byte), the existing flag state does not matter and (rows 1 and 2) the newly stored byte may be either the old byte or the new byte, since they are the same. Moreover the flag bit counts up to 1, if not already there to indicate that a match occurred. Although either byte can logically be stored, a decision has to be taken which to store as a matter of hardware design.

If the old and new bytes do not match, (rows 3 and 4 of Table 1), the flag bit is counted down to 0, if not already there. If the old flag bit was 1 (meaning that the bytes in the two preceding refresh cycles matched) it is assumed that the old byte is likely to be correct and accordingly (row 4) this is the byte which is stored. If the old flag bit was 0 the new byte is clearly preferred and is thus the byte which is stored (row 3).

From time to time the block of data may be changed. The apparatus can be left to adapt to the new block as follows, (ignoring the fact that some particular bytes may not change):

Refresh Cycle 1. Old flags all at 1 are all set to 0 but the old block of data is retained (row 4 of Table 1).

Refresh Cycle 2. Flags remain at 0 but the new block of data is stored (row 3 of Table 1).

Refresh Cycle 3. Flags set to 1 and either block of data is stored (row 1 of Table 1).

Refresh Cycles 4, etc. Flags remain at 1 and either block of data is stored (row 2 of Table 1).

The apparatus can, however, be modified to adapt more quickly, cutting out Refresh Cycle 1 of the above scheme. Use is made of a signal, which is referred to as UPDATE and which indicates that the block is a new or changed block, to force the flags to 0 with storage of the new bytes, regardless of the states of the old flags and of the match conditions, (row 5 of Table 1).

The invention can be extended to employ more than one flag bit per byte. For example two bits could be counted up to 11 by matches and down to 00 by mismatches, 00 and 11 representing limit states corresponding to minimum confidence and maximum confidence respectively in the old byte. It may then be decided that the new byte is always stored unless the old flag is 11 or it could be decided that the new byte is stored when the old flag is 00 or 01, while the old byte is stored when the old flag is 10 or 11. It should be emphasised that, although the flag bits store a history going back over several cycles, only a single block of data is stored at any one time.

It may be important for the user of the receiver to know whether the currently stored block of data has complete integrity or not; this may be signalled on the basis of the collective state of the flag bits as explained below.

An embodiment of the invention will now be described, by way of example, with reference to the block diagram constituting the sole FIGURE of the accompanying drawing.

The illustrated apparatus is part of an otherwise conventional teletext receiver which demodulates 8-bit characters (bytes) from a television signal and feeds the characters as bit-parallel input data DI to a data register 10 which has one address location per character. An addressing circuit 11 addresses these locations in sequence in synchronism with the received characters, as is conventional in teletext receivers. Such addressing may be by random access techniques or by employment of a bit-parallel recirculating shift register as the data register 10, as is well known in the art. As the register locations are accessed in sequence, the characters are read out and rewritten, the read-out characters constituting output data DO which is conventionally fed to a decoder for display on a television screen.

The read-out characters are also fed back as data D(n), i.e. data for the n$^{th}$ refresh cycle, to a comparator 12 which compares each old character of D(n) with the corresponding new character of DI, producing a match signal M=1 if the characters match or M=0 if they do not match. The comparator 12 can compare only the 7 data bits of the character if the 8th bit has no information content. If, as proposed in the aforementioned application No. 41265/77, the 8th bit does have information content, the comparator should compare all 8 bits.

The signal M constitutes one input to a logic circuit 13. A second input is UI where UI=1 means UPDATE. This signal is provided when a page is changed or is updated as indicated by the update control bit referred to in the document "Broadcast Teletext Specification". A third input is F(n), namely the old flag bit from a flag bit register 14 which is addressed in synchronism with the register 10 so that, as each character of D(n) is presented for read/rewrite, so is the corresponding flag bit of F(n).

The logic circuit 13 provides a selection signal S to a data selector or multiplexer 15 which selects either the old character D(n) to be written back into the register 10 as D(n+1) when S=0, or the new character DI when S=1. The circuit 13 also provides F(n+1) for writing back into the register 14. The circuit 13 is constructed in accordance with the truth table constituting Table 2.

TABLE 2

| Inputs | | | Outputs | |
|---|---|---|---|---|
| UI | M | F(n) | S | F(n+1) |
| 0 | 1 | 0 | E | 1 |
| 0 | 1 | 1 | E | 1 |
| 0 | 0 | 0 | 1 | 0 |
| 0 | 0 | 1 | 0 | 0 |
| 1 | X | X | 1 | 0 |

In this Table X means "don't care" and E means "either", i.e. a system design option.

One way of exercising the option is to say that, whenever UI=0, S is always complementary to F(n).

It can be seen that operation of the logic circuit in accordance with the truth table correctly establishes the conditions of Table 1.

It has been assumed so far that F(n) is a single flag bit per character. In this case the register 14 can comprise one bistable circuit for each character which is set by F(n+1)=1 and reset by F(n+1)=0. If F(n) is two flag bits per character, the register 14 can comprise a non-cyclic two bit counter for each character, which counter counts up (to 11) for each F(n+1)=1 and counts down (to 00) for each F(n+1)=0. In this case the logic 13 has to be developed in accordance with which states of F(n) make S=1 and which make S=0. The non-cyclic counter need not necessarily increment and decrement in unit steps and the sizes of the steps may be functions of the state of the counter. Although the described embodiment will give a high degree of probability that the data in the register 10 is correct, even when there has been errors in DI it may be necessary for the user to know when any suspicion attaches to the data. This may be done by signalling whether all of the flag bits in the register 14 are 1 or not. For this reason, a status circuit 16 is connected to the output of the flag register and controls a signal device 17, which could be a green lamp lit when all flag bits are 1 or a red lamp lit when any flag bit is 0. The status circuit could comprise parallel AND logic or be a serial device such as a bistable circuit which is reset at the beginning of each refresh cycle and set by any zero flag bit in the serial output F(n) from the register 14.

Other techniques may be employed. A substitute character, such as "delete" can be displayed when a flag bit is zero, just as a substitute character is displayed in known teletext systems until a parity check is satisfied. Alternatively the stored character can be displayed but with some means of drawing attention to the doubt attaching thereto, e.g. display and background colours transposed, display flashing quickly or character underlined. All such techniques are within the capabilities of state of the art teletext receivers.

As described, the data selector 15 selects D(n) or DI for writing into the register 10. In practice the same result may well be achieved by enabling a DI write operation when the new byte is selected, otherwise leaving the contents of the register 10 unchanged. The selector 15 will not be required and the signal S will act as "write-enable" the the register 10.

I claim:

1. Data receiving apparatus comprising means for storing a block of received bytes, means for storing at least one flag bit individual to each byte, and control means operable in each refresh cycle of the apparatus and on a byte-by-byte basis to compare the currently received byte with the currently stored corresponding byte, to subject the corresponding flag bit(s) to a non-cyclic count operation of one sense when the compared bytes match and of the other sense when the compared bytes do not match, and to replace the stored byte by the received byte, when they do not match, conditionally in dependence upon the state of the corresponding flag bit(s) established in the preceding refresh cycle.

2. Data receiving apparatus according to claim 1, wherein there is a single flag bit per byte and the apparatus acts in accordance with the following table:

| INPUTS | | OUTPUTS | |
|---|---|---|---|
| MATCH | OLD FLAG | BYTE STORED | NEW FLAG |
| YES | A | EITHER | B |
| YES | B | EITHER | B |
| NO | A | NEW | A |
| NO | B | OLD | A | where A is one of the binary values 0 and 1 and B is the other binary value.

3. Data receiving apparatus according to claim 2, wherein the apparatus is further responsive to a received UPDATE signal to store NEW bytes for the remainder of the block and to set each flag bit to A.

4. Data receiving apparatus according to claim 2 or 3, comprising means arranged to signal whether or not all flag bits have the value B.

* * * * *